United States Patent [19]
Bhat et al.

[11] 3,823,486
[45] July 16, 1974

[54] TOROIDAL ELECTROLYTIC SENSOR AND METHOD OF MANUFACTURE

[75] Inventors: Ghanshyam A. Bhat, Tempe; Charles G. Buckley, Phoenix, both of Ariz.

[73] Assignee: Sperry Rand Corporation, New York, N.Y.

[22] Filed: Apr. 24, 1972

[21] Appl. No.: 247,078

[52] U.S. Cl. .............................................. 33/366
[51] Int. Cl. ........................... G01c 9/06, G01c 9/20
[58] Field of Search ........ 33/315, 366, 377; 29/570, 29/573

[56] References Cited
UNITED STATES PATENTS

| | | | |
|---|---|---|---|
| 1,356,823 | 10/1920 | Klein | 33/377 X |
| 1,444,444 | 2/1923 | Babcock | 33/377 |
| 3,171,213 | 3/1965 | Swarts et al. | 33/377 X |
| 3,307,086 | 2/1967 | Propps | 29/570 X |
| 3,442,023 | 5/1969 | Remington et al. | 33/366 |
| 3,604,275 | 9/1971 | Fox et al. | 33/366 X |

FOREIGN PATENTS OR APPLICATIONS

| | | | |
|---|---|---|---|
| 878,726 | 4/1953 | Germany | 33/377 |

*Primary Examiner*—Samuel B. Rothberg
*Assistant Examiner*—Charles E. Phillips
*Attorney, Agent, or Firm*—Howard P. Terry; Thomas J. Scott

[57] ABSTRACT

A sealed toroidal sensor is formed from two members each including a channel that defines an inner arcuate chamber having a cross-sectional area with a characteristic dimension along a prescribed section of its arcuate length for a given linear angular range and a reduced cross-sectional area along the remaining section of its arcuate length to provide an improved temperature insensitivity. A first electrode is deposited along the prescribed section in the channel of a first of said members and second and third electrodes are deposited along oppositely disposed arcuate lengths of the prescribed section in the channel of the second of said members. After the two members are joined together forming the toroidal housing, an electrolyte is added to the inner chamber which covers relative portions of the electrodes and varies the impedance of the second and third electrodes with respect to the first electrode in accordance with the angular displacement of the device. A novel method of manufacture of the sensor is also disclosed.

4 Claims, 7 Drawing Figures

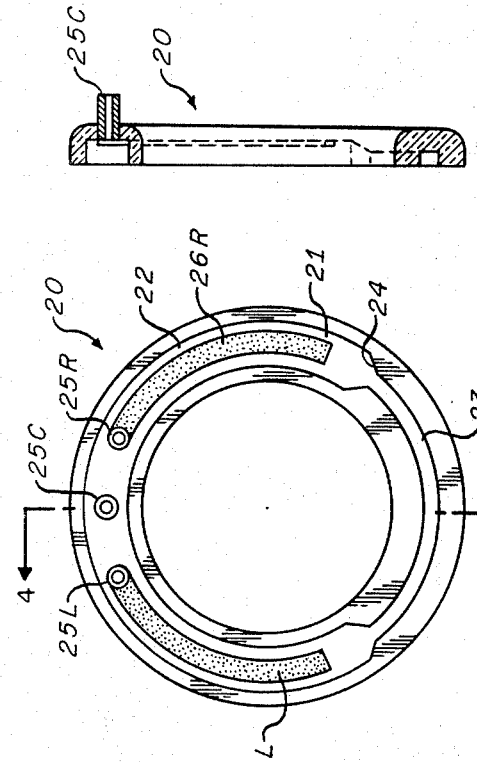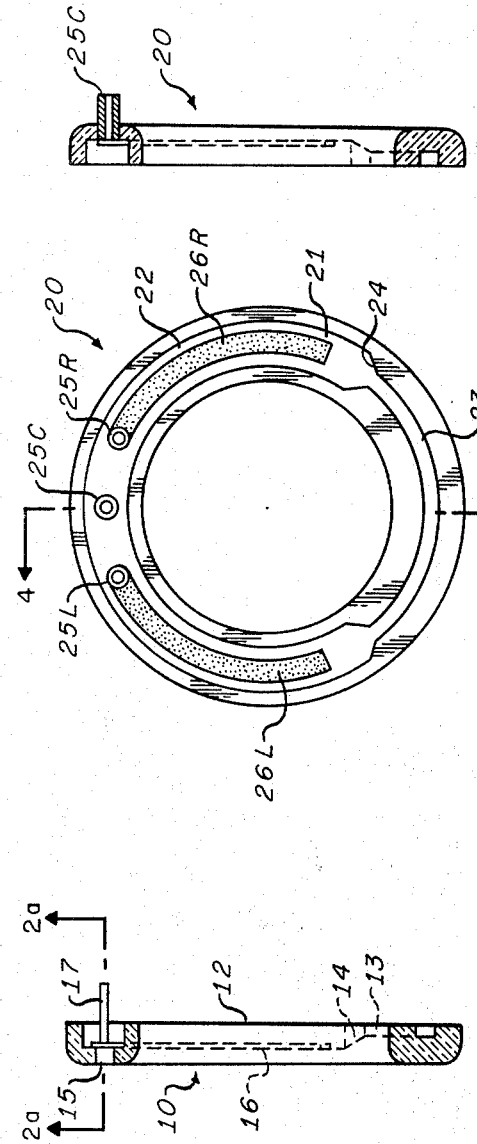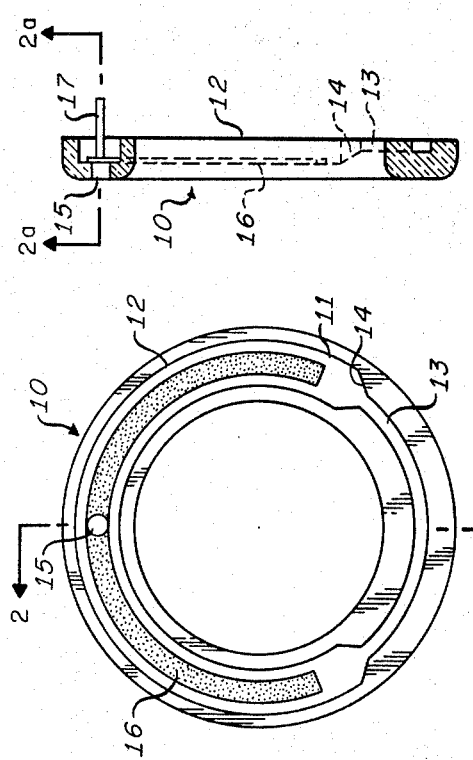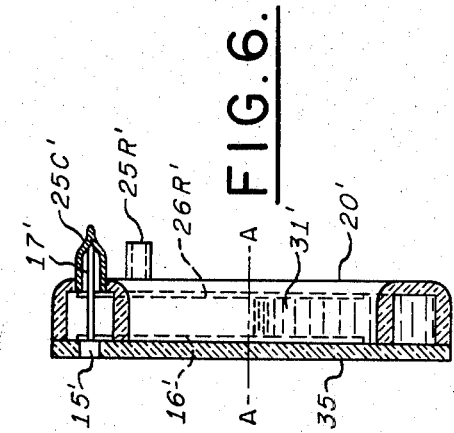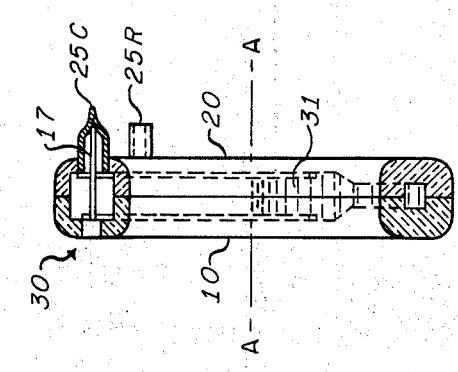

TOROIDAL ELECTROLYTIC SENSOR AND METHOD OF MANUFACTURE

BACKGROUND OF THE INVENTION

1. Field of the Invention

The invention pertains to a sensor apparatus for providing electric signals in accordance with acceleration forces, including the acceleration of gravity to which it is subjected and the method for manufacturing the sensor apparatus. More particularly, the invention pertains to electrolytic accelerometers or level detectors and the method of manufacturing the same.

2. Description of the Prior Art

The subject invention is an improvement over the device disclosed in U.S. Pat. No. 3,604,275 entitled "Toroidal Electrolytic Sensor" of T. S. Fox et al, issued Sept. 14, 1971 and assigned to the same assignee as th present invention.

In the prior art device, the toroidal housing comprised a hollow tubular glass member which was formed into a substantially toroidal configuration of a desired diameter and included first and second pairs of arcuate shaped electrodes each having a radius suitable for insertion into the hollow toroidal housing. Each of the pairs of shaped electrodes were fused into a pair of spaced glass beads and inserted into the hollow toroidal housing where the glass beads were then fused to the inner wall of the tubular glass member. The arcuate or angular separation between the glass beads determined the linear angular range of the device because the beads produced a discontinuity in electrolyte surface and therefore in the output signal. Furthermore, the separation could not be too great or else the electrodes would become unstable thereby degrading the accuracy of the sensor. The open ends of the tubular glass member were then sealed allowing the ends of the first and second pairs of electrodes to extend therethrough for connection to an external electronic circuit.

The desired diameter of the tubular member extended along a substantial portion of its length except for a relatively small necked-down portion which provided damping of the electrolyte for low frequency perturbations of the sensor. Since the desired diameter was not required beyond the lower glass beads which defined the negative limits of sensitivity of the device, it required the presence of extra fluid to fill up the lower portions of the device. As a result, the prior art sensor is more susceptible to temperature variations than necessary for the given linear angular range of the device.

A first configuration of the subject invention is an improved sensor apparatus that eliminates the glass tube and the glass beads required for mounting the electrodes therein and enables the necked-down portion which provides low frequency damping to be compatible with a given linear angular range of the sensor thereby providing a sensor being less effected by temperature variations, the improved configuration lending itself to mass production for a fraction of the cost of the hand operation required to make the prior art device.

A second configuration provides an improved sensor apparatus including the advantages of the first configuration but further providing a sensor having an accuracy which is an order of magnitude greater than the first configuration due to dimensional control achieved.

SUMMARY OF THE INVENTION

The present invention comprises a sealed toroidal electrolytic sensor formed of a sandwich of two substantially identical toroidally shaped halves which may be either completely molded for economy of manufacture or molded and finished machined for substantially increased accuracy. Each member includes a channel that forms an inner arcuate chamber of toroidal configuration when the two members are sealed together. The inner chamber of the toroidal configuration has a cross-sectional area with a characteristic dimension along a prescribed arcuate section of its circular length over which its output signal will be linear. The remaining section has a reduced cross-sectional area along the remaining section of the chamber's circular length which is normally filled with electrolyte for reducing the sensor's sensitivity to temperature variations. One of the members has a metallic insert sealed into its wall generally opposite the portion of the channel with the reduced cross-sectional length. A continuous electrode is deposited by a sputtering process on the bottom surface of the channel along the prescribed section of this member and over the insert to assure positive electrical continuity. The other member has three hollow or tubular metallic terminals sealed into its wall also generally opposite the reduced cross-sectional portion of the channel. Two electrodes are deposited by sputtering along oppositely disposed arcuate lengths of the bottom of the channel in this other member and over the exposed surfaces of the tubular terminals to assure positive electrical continuity. A conductor wire is spot welded to the inner surface of the insert and fed through one of the hollow terminals of the second member. The two members are then sealed together using a frit-type seal forming the toroidal housing. An appropriate amount of electrolyte is added to the longitudal inner chamber using the remaining hollow terminals. The hollow terminals are pinched off and form connection terminals for an external electronic circuit.

As described, the molded configuration of the present invention provides an economical toroidal sensor with a given linear angular range and is particularly adapted for mass production. If greater accuracy is required, the molded and machined configuration may be used. With this configuration, the channels in the two half premolds and their mating surfaces may be precision machined to provide extremely uniform channel walls.

A modification of the above structure is disclosed in which only one of the molded members includes a channel of the desired cross-sectional area and the other member comprises merely a flat ring which serves, when sealed to the first member, to form the toroidal chamber.

BRIEF DESCRIPTION OF THE DRAWINGS

FIG. 1 is a front elevation of the first member of the toroidal housing;

FIG. 2 is a side elevation in section of the first member taken on the line 2—2 of FIG. 1;

FIG. 2a is a partial section of FIG. 2 taken on line 2a—2a of FIG. 2;

FIG. 3 is a front elevation of the second member of the toroidal housing;

FIG. 4 is a side elevation in section of the second member taken on the line 4—4 of FIG. 3;

FIG. 5 is a side elevation in section of the assembled and sealed toroidal sensor; and FIG. 6 is a section, similar to FIG. 5 of a modification of the present invention.

DESCRIPTION OF THE PREFERRED EMBODIMENT

As shown in FIG. 1, a molded first member 10 formed in the shape of a half toroid includes a channel 11 comprised of three different sized sections 12, 13 and 14. The first section 12 has a cross-sectional area equivalent to one-half of the total cross-sectional area of the inner chamber in a completely assembled sensor 30 as shown in FIG. 5. The second section 13 has a reduced cross-sectional area relative to that of the cross-sectional area of the first section 12. The last part of the channel 11 includes a pair of transitional sections 14 which form throat-like cross-sections that couple the first section 12 to the second section 13. Since the accuracy of the assembled sensor 30 is a function of the dimensional uniformity of the channel sections 12, 13 and 14, this dimensional uniformity may be achieved by precision machining the channel 11. For example, the member 10 may be initially molded without a channel and then the channel may be routed with a precision router. Alternatively, the member 10 with a molded channel may be finished machined with high precision.

Assembled into the first member 10 generally opposite the channel portion 13 is a solid insert 15 of a suitable conductive material such as platinum shown in section in FIGS. 2 and 2a. An electrode 16 which may be comprised of platinum is deposited for example by sputtering along a substantial portion of the longitudinal arcuate length on the bottom surface of the channel 11 in the first section 12. By the method of manufacture, to be described below, the insert 15 is in positive electrical contact with the electrode 16 and a wire 17 is welded to the deposit 16 and insert 15. The wire 17 includes a bend at the weld point as shown more clearly in FIG. 2a which protects the weld during pinch-off of the tube in a later stage of the sensor assembly to be described below.

A substantially identical molded second member 20 shown in FIG. 3 includes a channel 21 having first, second and third sections 22, 23 and 24 which correspond to sections 12, 13 and 14, respectively, in channel 11. Since these sections of channel 21 are identical to the corresponding sections of channel 11, no further description is deemed necessary. It will be understood that finish machining may also be employed, as above. Assembled into the second member 20 are three hollow terminals 25L, 25C and 25R of a suitable conductive material such as platinum. A pair of electrodes 26L and 26R which may also be comprised of platinum are formed preferably by a sputtering process and deposited along oppositely disposed arcuate lengths on the bottom surface of the channel 21 in the first portion 22. Electrode 26L and electrode 26R are, by the sputtering process, electrically connected with the terminals 25L and 25R, respectively. The terminal 25C is positioned in channel 21 so that it is aligned with the insert 15 and wire 17 in the channel 11 of the first member 10.

The assembled toroidal sensor shown in FIG. 5 has the first and second members 10 and 20 sealed together to form the toroidal sensor 30. During assembly, the wire 17 is passed through the hollow terminal 25C and pinched off leaving only the terminals 25L and 25R open to the external atmosphere. After cleaning the interior channel, an electrolytic fluid 31 is added to the inner chamber through either the terminal 25L or 25R, the quantity thereof being carefully predetermined to partially cover the electrodes 26L and 26R to a predetermined level such as the reference line A—A. The terminals 25L and 25R are then pinched off, selaed and conditioned for connection to an external utilization apparatus which may comprise for example a Wheatstone Bridge circuit.

The arcuate length of the first section 12 is prescribed in accordance with a given or desired angular range for the device. For example, if the device is required to sense angular displacements of ±30°, then the arcuate length of the first section 12 must extend at least 30° above and below the reference line A—A.

The arcuate length of the channel section 13 is determined by the desired angular range of the sensor and in some applications may be eliminated entirely. The length of the second section of reduced cross-sectional area is provided primarily to reduce the total amount of electrolytic fluid 31 in the channel 11. Since the total volume of electrolytic fluid 31 varies with temperature, the sensitivity of temperature variations may be reduced by reducing fluid volume. Therefore, a rendered cross-sectional area along the unused arcuate length of the channel 11 provides a sensor 30 with a minimum of electrolytic fluid 31 and an improved temperature insensitivity.

In a toroidal electrolytic sensor suitable for gyroscopic applications or other high vibration environments, the Bond number is the most significant indication of the surface stability of the electrolyte as taught in the referenced U.S. Pat. No. 3,604,275. The Bond number is a function of the characteristic dimension of the sensor, i.e., the internal radius or cross-sectional area of the toroidal housing. In order to provide a sensor with optimum performance, it is necessary to have tight dimensional control of the characteristic dimension in the manufacturing process. The molding and lapping procedure employed in manufacturing the subject sensor provides an economical method for producing the molded sensor 30 in large quantities while also providing control of the characteristic dimension comparable to prior art devices. In addition, by precisely machining the internal channel surfaces of the members 10 and 20, the uniformity of the toroidal channel throughout its length will be achieved thereby providing a sensor of greater accuracy.

While in the preferred embodiment of the present invention, the electrodes 16, 26R and 26L are deposited on the bottom surface of the toroidal channel, it will be understood that, with respect to other inventive concepts disclosed herein, the electrodes may be thin arcuate strips of conduction material, such as platinum bonded to the bottom surface of the channel and spot welded to the plug 15 and hollow terminals 25R and L.

The method of manufacturing the toroidal sensor 30 includes the steps of molding two substantially identical first and second members 10 and 20 of a suitable material such as glass or other ceramic or vitreous material.

In one configuration of the device Corning Glass Works, 9010-Potash Soda Barium Glass was used with desirable results. The bottom surfaces of channels 11 and 21 of molded members 10 and 20, respectively, are sand blasted in order to remove the glazed skin from the surfaces to thereby assure proper adhesion of the sputtered platinum. The molded members 10 and 20 have their sealing surfaces lapped so that the molded sealing surfaces are flat and the mold has a specified dimension. The molded members 10 and 20 are flushed to remove most of the lapping compound and then finally cleaned with an ultrasonic cleaner and dried with an appropriate drying agent. The three hollow or tubular terminals 25L, 25C and 25R which may be of any suitable conducting material such as platinum are assembled into suitable holes in the second member 20 using sealing devices such as preglazed solder glass sealing rings which are then suitably oven fired. The ends of the terminals at the inside surface of the second member are then lapped flush with the inner surface of the channel 11. The insert 15 is similarly assembled into a hole in the first member 10 and oven fired. The ends of the insert at the inside and outside surfaces of the first member 10 are lapped flush with these surfaces. The molds are once again flushed to remove most of the lapping compound and finally cleaned in an ultrasonic cleaner prior to drying with a suitable drying agent.

A film, for example, about 40 microinch thick, of a suitable conducting material such as platinum is used to form the electrodes 16, 25L and 26R. These electrodes are deposited by a sputtering process on the selected areas of the bottom surfaces of the channels 11 and 21 of the members 10 and 20. The electrodes 16, 26L and 26R make positive electrical contact with insert 15 and terminals 25L and 25R, respectively, by sputtering the electrodes directly over the ends of the insert and terminals. A wire 17 of a conducting material such as platinum is laid in the channel 11 and spot welded to the insert 15. After welding, the wire is carefully bent up and a loop is formed thereon as shown in FIG. 2a. A layer of paste, commonly known as a frit, is subsequently applied to the abutting surfaces of the first and second members 10 and 20 using a silk screen technique and allowed to air dry. After pre-glazing the frit, the first and second members 10 and 20 are precisely aligned, as by suitable indices on each piece, and joined together with the wire 17 passing through the hollow terminal 25C. The members 10 and 20 are held together by appropriate means and baked to form the sealed toroidal housing 30. The terminal 25C is pinched off, sealed and conditioned for connection to an external electrical circuit. Solder may be used as the sealing and conditioning agent for this step of the procedure. The assembled sensor is thoroughly flushed out through the hollow terminals 25L and 25R and dried. An electrolytic fluid is then added to the toroidal sensor 30 using a calibrated syringe with a stainless steel needle which is inserted through either terminal 25L or 25R while air is allowed to vent through the other terminal. After filling the sensor 30 to the proper reference level, the terminals 25L and 25R are pinched off, sealed and conditioned using the same procedure as followed in sealing and conditioning terminal 25C above.

A modification of the present invention is shown in FIG. 6. In this modification, which provides further manufacturing economies, only one of the members 20' is molded with the channel, the depth of which defines the entire cross-sectional dimension thereof. This channel is then closed by means of a simple flat washer shaped ring 35. Of course, the plug 15' and electrode 16' corresponding to electrode 16 of FIG. 1 are carried by the inner surface of the ring 35. The principal advantage of this modified construction is that in assembling the members together their alignment tolerances may be somewhat relaxed. Additionally, instead of depositing the electrodes 26R' and 26L' on the bottom of the channel and the electrode 16' on the mating closure ring 35, the electrodes 26R' and 26L' may be deposited on the outer wall of the channel and the electrode 16' deposited on the inner wall of the channel with deposited tabs connecting the terminals 15', 25R' and 25L'.

The toroidal sensor 30 manufactured in accordance with the procedures detailed above does not contain the raised glass beads and raised electrodes of the prior art device which decreased its accuracy by interfering with the flow of the electrolyte through the inner chamber of the sensor.

Further, molded sensors manufactured in accordance with the steps described and for a fraction of the cost of the prior levels have exhibited accuracies on the order of 6 arc minutes in predicting angular displacements of 10° from null position of the sensor and machining the inner surfaces of the channels 11 and 21 will provide sensors having accuracies down to seconds of arc.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. An electrolytic level sensor subjected to acceleration forces comprising
   a toroidal shaped housing formed of a first and second moulded and sealed members at least one of said members including a channel for providing with said other member a toroidal chamber within said sealed toroidal housing having a characteristic dimension along a prescribed section of its arcuate length,
   a metallic plug insert centrally positioned with respect to said prescribed section in said channel of said first member,
   first thin electrode means deposited along said prescribed section in said channel of said first member and in electrical contact with said plug,
   wire means spot welded to said metallic plug,
   first, second and third tubular conducting terminals inserted in said second member whereby said wire means is in electrical contact with and disposed within said first terminal,
   second and third thin electrode means deposited along first and second arcuate lengths, respectively, within said prescribed sections of said chamber on said second member whereby said second and third electrode means are in electrical contact with said second and third hollow conducting terminals, and an electrolyte within said inner chamber covering a portion of said first, second and third electrode means, respectively, whereby the impedances of said second and third electrodes will vary with respect to said first electrode as measured between said first, second and third terminals in accordance with the position of the surface of said electrolyte relative to said second and third electrodes, and said surface has a stability which is a function of at least said characteristic dimension, said acceleration forces and the density of said electrolyte.

2. The electrolytic level sensor as set set forth in claim 1 wherein said channel is precision machined for forming a precisely uniform channel whereby to increase the accuracy of said level.

3. An electrolytic sensor as recited in claim 1 in which said first, second and third deposited electrode means are sputtered electrodes of a conducting material such as substantially pure platinum.

4. An electrolytic level sensor as recited in claim 1 in which said wire means spot welded to said metallic plug includes a strain inhibiting loop for maintaining electrical contact with said metallic plug in the presence of strain applied to said wire means.

* * * * *